Patented Oct. 24, 1950

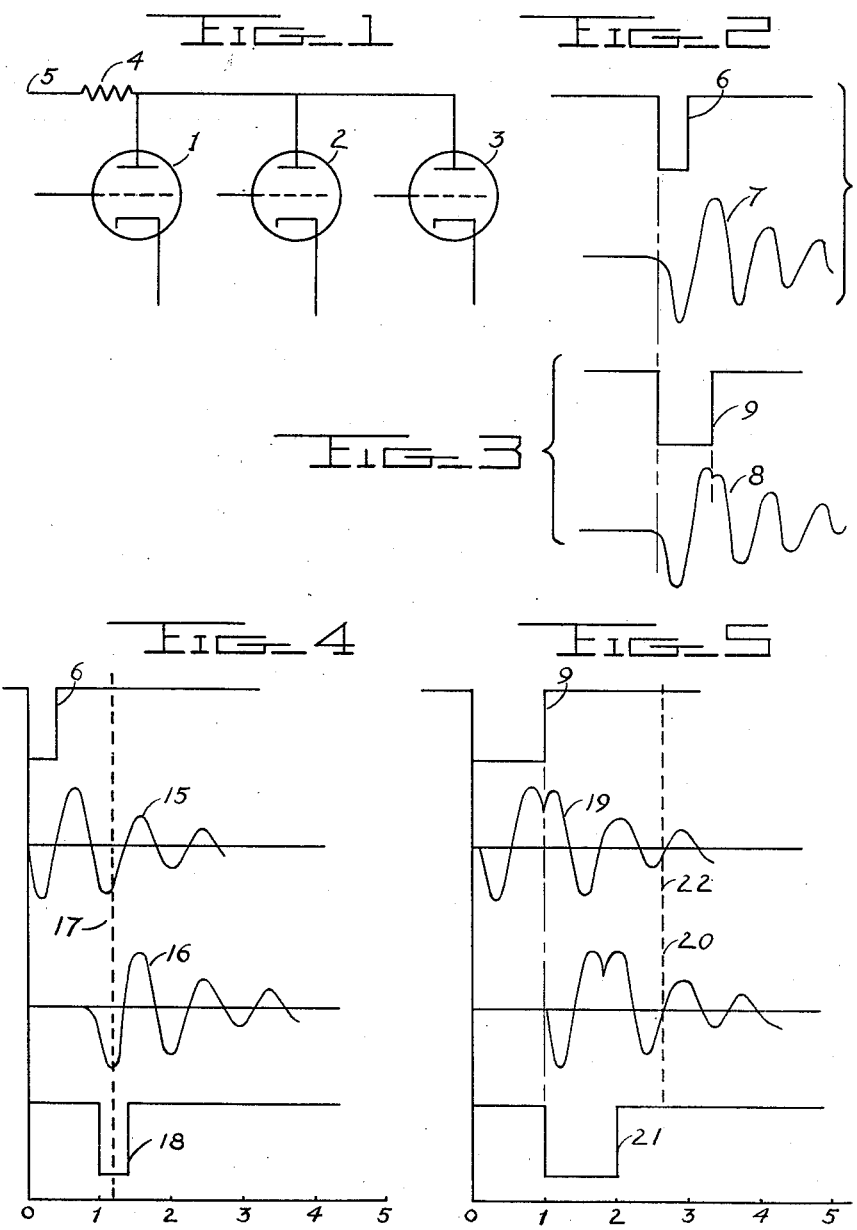

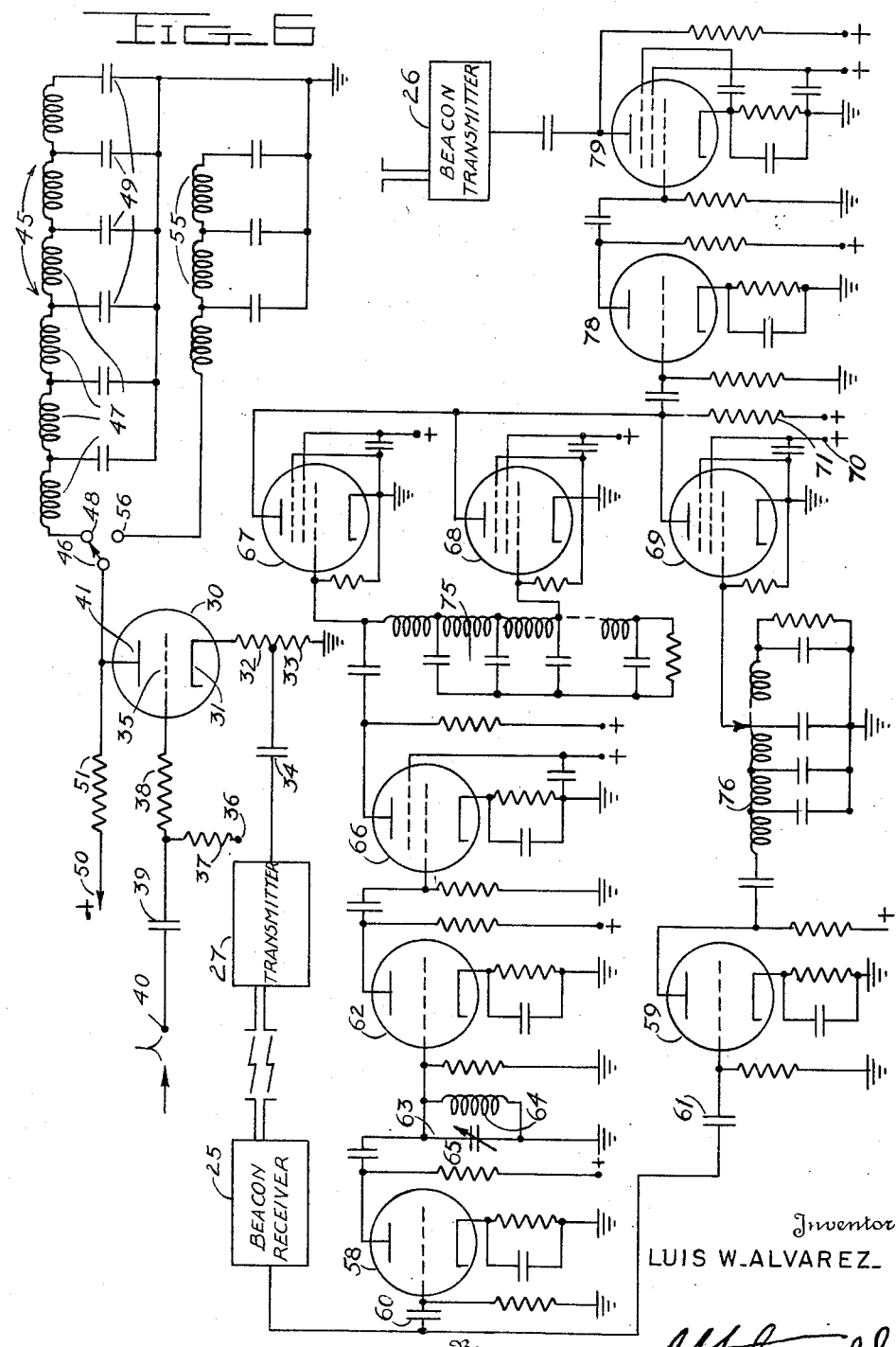

2,527,474

UNITED STATES PATENT OFFICE 2,527,474

RADIO BEACON AND DISCRIMINATING CIRCUIT THEREFOR

Luis W. Alvarez, Belmont, Mass., assignor, by mesne assignments, to the United States of America as represented by the Secretary of the Navy Application October 14, 1943, Serial No. 506,275

18 Claims. (Cl. 343—101)

This application relates to radio beacons and particularly to those which are adapted to be actuated from a remote point as, for instance, from an airplane in flight or a ship at sea.

One of the objects of the invention is to provide a radio beacon system in which a radio signal used for other purposes in an airplane or other vehicle may be altered in a predetermined manner and thus altered, will actuate a beacon at a remote point.

Another object of the invention is to provide a beacon which is actuated only by a signal of a predetermined character.

Still another object of the invention is to provide a discriminating circuit which will respond only to a signal of a predetermined character and which, when it responds, will actuate the beacon.

Still another object of the invention is to provide a discriminating circuit which will respond when a substantially square pulse of short time duration, as, for instance, one measured in microseconds or even a fraction of a microsecond, is applied to the circuit, but which will produce substantially no response when pulses of somewhat different duration and other shapes are applied to the circuit.

Other objects and objects relating to the method of connecting the various parts of the system will be apparent as the description of the invention proceeds.

One embodiment of the invention has been illustrated in the accompanying drawings in which:

Fig. 1 is a simple circuit diagram illustrating one of the principles upon which the operation of the discriminating circuit is based;

Figs 2 and 3 are diagrams of two different pulses together with the oscillations which result when these pulses are applied to a portion of the circuit;

Figs. 4 and 5 are diagrams of wave forms produced in different parts of the circuit by pulses of different time duration; and Fig. 6 is a circuit diagram of the entire system, certain components which make use of standard equipment being illustrated in block form.

Broadly the invention contemplates a radio beacon system which will be actuated by a signal transmitted by the radio equipment installed on an airplane but only when that signal differs in a predetermined manner from that normally transmitted. When the radio equipment on the airplane is being used for other purposes the beacon will not be actuated. The special signal will, however, actuate the beacon and if the beacon signal may be picked up by the airplane, identity of the beacon and its direction from the airplane may be determined in any desired manner.

The discriminating circuit of the beacon is based upon two known principles, one of which involves the use of a coincidence circuit, using three tubes, and the other, the effect of shocking an oscillating circuit into oscillation by a square pulse.

In the circuit of Fig. 1 three tubes, 1, 2, and 3 are shown connected in parallel and having a resistor 4 connected in the plate circuit between the plates and the source of potential which is indicated at 5. Assume that the resistor 4 is high and that the three tubes, 1, 2, and 3 have their grids biased so that the tubes are conducting. The plates of these tubes will then have a certain potential. If one of the grids, as, for instance, the grid of tube 1, is swung in a negative direction until the tube stops conducting, the tube 1 will then have a high resistance, but the tubes 2 and 3 are in parallel with it and have low resistance; therefore, the plate potential will change very little, if at all. The same thing will happen if the grid of either or both of the tubes 2 and 3 is swung in a negative direction so as to shut off the tube while any one of the other tubes is still conducting. However if the grids of all three tubes are given a negative potential at the same time, sufficient to stop the current flowing in these tubes, then the plates of these tubes will rise in potential and a strong positive pulse will be produced on the plates. Any number of tubes may be connected thus in parallel and will produce the same effect. As long as one of the tubes is conducting, the high resistance in parallel with it will not affect the plate potential, but if all of the tubes are shut off simultaneously, then the plate voltage will rise. Three such tubes are used in the discriminating circuit of the invention and no pulse will be produced by the circuit until the grids of all three tubes are driven below cut-off at the same time. The manner of connecting these tubes and their function in the circuit will be described later.

The second principle upon which the invention is based concerns the shocking into oscillation of an oscillatory circuit by means of a square pulse. If an oscillatory circuit, as, for instance, a coil shunted by a condenser, has an oscillating period of a given time, and a square pulse equal in time duration to a small fraction of the time period of the oscillatory circuit is applied to the circuit, the circuit will be shocked into oscillation and a series of damped oscillations are set up in the circuit. In Fig. 2 the square pulse 6 is used to shock such an oscillating circuit and produces the damped oscillation 7. If now the time duration of the square pulse is increased, the same kind of oscillation as indicated at 7 will be produced until the square pulse reaches a time duration about equal to one-half the time period of the oscillating circuit. However, as the pulse time duration gets still longer, a slight, non-uniformity of the spacing of the oscillations appears. Such an oscillation 8 is illustrated in Fig. 3 as produced by the square pulse 9 whose time duration is greater than one-half of the time period of the oscillating circuits.

In carrying out the objects of the invention an oscillating circuit is shocked into oscillation by a square pulse and the oscillations produced by the circuit are split into two portions. One portion is applied directly to the grid of a tube, such as the tube 1 of Fig. 1, while the other portion is delayed in time and then impressed upon the grid of another tube, as for instance, the tube 2. The delay introduced to produce the delayed signals is of the order of the time period of the oscillating circuit.

In Fig. 4 a diagram of the oscillations produced in these two circuits is shown. The square negative pulse 6, which is assumed to be less than one half of the time period of the oscillatory circuit in time duration, will produce a damped oscillation, as already shown at 7 in Fig. 2 and which has now been indicated at 15 in Fig. 4. This oscillation 15 is applied to the grid of the tube 1. At 16 is shown the same oscillation after passing through a delay circuit, and this oscillation is applied to the grid of the tube 2. It will be seen that after the start of the oscillation 15 the first point where negative portions of the oscillations 15 and 16 coincide is indicated at the dotted line 17.

The base of the diagram is laid off in time units beginning with zero at the left, and the dotted line occurs at a point about one and one-quarter units from the zero point. At this point both the tubes 1 and 2 will be shut off, but unless tube 3 is shut off at the same time, the plate voltage of the tubes will not rise materially. I, therefore, lead a portion of the pulse 6 through another circuit which delays it for a time interval equal to about one unit, making it appear as indicated at 18 in Fig. 4. This pulse is applied to the grid of the tube 3. It will be seen that the grids of the tubes 1, 2, and 3 are therefore all negative at the same time and the plate voltage of these tubes rises to produce a strong positive pulse in the output circuit of these tubes.

In Fig. 5 the result of the square pulse 9 is shown, this pulse, in the present instance, being twice the duration of the pulse 6. When the pulse 9 shocks the oscillatory circuit into oscillation, the wave 19 is produced, this being the same as the wave 8. This wave is then applied to the grid of the tube 1. The wave 20, shown in Fig. 5, is the same oscillation after it has passed through the delay circuit and as it is applied to the grid of the tube 2. The pulse 9 after passing through its delay circuit appears at 21 on the grid of the tube 3. The first point after the start of the oscillation 19 at which the two oscillations 19 and 20 have coincident negative portions is indicated at the dotted line 22, which is shown as greater than two and one-half units on the time scale at the base of the figure. Although at this time the grids of the tubes 1 and 2 are both negative, the grid of the tube 3 is no longer negative because the pulse 21 has been completed and the tube 3 is conducting again.

From the diagrams of Fig. 4 and Fig. 5 it will be seen, that, with the particular arrangement described, a narrow pulse which is less than one-half of the time period of the oscillating circuit will create a condition where the grids of the three tubes 1, 2, and 3 are negative at the same time, while a wider pulse, which is wider than about one-half of the time period of the oscillating circuit would produce a condition where only two of the tubes are negative at the same time. The narrow pulse 6 of Fig. 4 will thus produce an output pulse in the circuit of Fig. 1, while the wider pulse 9 of Fig. 5 will produce no such output pulse.

In Fig. 6 is shown a complete circuit diagram for a beacon system in which the beacon is shown provided with a receiver 25 and a transmitter 26, the discriminating circuit being shown between the receiver and transmitter. The beacon is actuated by a transmitter 27 which may be located at some remote point, as, for instance, on an airplane, the pilot of which is desirous of securing the beacon signal in order to get his bearings.

The transmitter 27 may be arranged to radiate oscillations in the microwave range, and those oscillations may be controlled in any desirable manner, as, for instance, by means of the tube 30 which has its cathode 31 connected to ground through resistors 32 and 33. The juncture of the resistors 32 and 33 is connected through a condenser 34 to the control circuit of the transmitter. The tube 30 may be of the gas-filled type, and, as such, acts as a switch, either shutting off all current flowing in the plate-cathode circuit or permitting the current to flow. The grid 35 of the tube 30 is given a suitable biasing potential through two resistors 37 and 38 in series from a source, indicated at 36. The juncture of these resistors is connected through a condenser 39 to a source 40 of trigger pulses for operating the tube 30.

It will be understood that the tube 30 is under control of its grid 35 as long as no plate-cathode current is flowing, but as soon as this current starts to flow by reason of the grid having a sufficiently positive potential applied to it, the control is taken away from the grid and the tube will continue to conduct as long as there is sufficient potential difference between the plate 41 and the cathode 31 to sustain the discharge.

Where the transmitter 27 acts as a transmitter in an airplane for radio-echo detection work, it may be desired to cause the transmitter to radiate a succession of pulses at spaced intervals, there being no radiation at all between any two of the pulses. In order to produce these pulses, a pulse-forming network 45 is shown connected through a switch 46 to the plate 41 of the tube 30. This pulse-forming network may comprise a plurality of inductances 47 connected in series to one contact point 48 of the switch 46 and a plurality of condensers 49 connected in parallel, there being one condenser between the outer end of the last inductance and ground, while the remaining condensers are connected between the junction points of the inductances 45 and ground. The plate of the tube 30 is also connected to a source of potential, indicated at 50, through a high resistance 51.

When the tube 30 is not conducting, the condensers 49 will charge to a predetermined potential and when the tube 30 suddenly becomes conducting by application of a trigger pulse to the grid 35 from the source 40, the condensers 49 start to discharge through the tube 30 and the potential across the plate and ground drops to a value of half of the voltage to which the condensers are charged, providing the characteristic impedance of the network is substantially equal to the load impedance offered by the tube 30. A voltage wave will start to the right and follow along the network and be reflected back from the open end, whereafter the voltage across the plate-cathode circuit of the tube will drop substantially to zero. The reduction of the plate voltage will cause the tube 30 to become nonconducting again and the grid 35 will assume control of the tube. The time during which the tube 30 will remain conducting will depend on the parameters of the pulse-forming circuit 45. In the arrangement shown, the pulse-forming circuit 45 is designed to produce the pulse 9 shown in Figs. 3 and 5, this being the pulse used for radio-echo detection in the airplane.

However, I provide another pulse-forming network 55 which is arranged to produce pulse 6 of Figs. 2 and 4 which pulse as shown, is approximately one-half the width of the pulse 9. The pulse-forming net-work 55 is connected to another contact 56 of the switch 46, so that by moving the switch 46, it is possible to connect either the pulse-forming network 45 or the pulse-forming network 55 to the plate of the tube 41 and therefore cause the transmitter 27 to radiate pulses corresponding to the pulses 9 or to the pulses 6 of Figs. 3 and 2, respectively.

The square pulse received by the beacon receiver 25, after suitable amplification and detection, is delivered simultaneously to two thermionic tubes 58 and 59 through condensers 60 and 61, respectively. The tube 58 is coupled to another tube 62 by the usual form of resistance coupling and an oscillatory circuit 63 composed of the inductance 64 and the condenser 65, is connected between the grid of the tube 62 and ground. The tubes 58 and 62 are thus provided one at each side of the oscillating circuit 63 to isolate this circuit. The tube 58 prevents oscillations which are set up in the tuned circuit 63 from reflecting back into the input portion of the circuit, the tube 62 does very little amplifying but makes it possible for a tube 66 to amplify the oscillations which are otherwise difficult to amplify because of the low impedance of the oscillatory circuit 63.

The tube 62 is connected by the usual form of resistance coupling to the tube 66 which, in turn, is similarly connected to a tube 67 which corresponds to the tube 1 in the explanation given above the output circuits of tubes 68 and 69 being connected in parallel with it and corresponding to tubes 2 and 3. These tubes 67, 68, and 69 are shown as pentode tubes and have a common plate circuit connected to a source of potential, indicated at 70, through a high resistance 71.

The plate of the tube 66 is directly coupled to the grid circuit of the tube 67, and thus the oscillations produced by the oscillatory circuit 63 are amplified by the tubes 62 and 66 and applied to the grid of the tube 67. However, the output circuit of the tube 66 has a delay network 75 connected to it, and this delay network is connected to the grid of the tube 68, the arrangement being such that the output of the tube 66 is delivered directly to the tube 67, but it is also passed through the delay network 75 and delivered to the grid of the tube 68 at a later time.

The pulse received by the beacon receiver 25, as already mentioned, is applied directly to the grid of the tube 59 where it is amplified. The output of the tube 59 passes through an adjustable delay network 76 which, in the present example, delays the pulse for a time period substantially equal to the period of oscillation of the oscillatory circuit 63, whereupon it is applied to the grid of the tube 69.

The output of the parallel tubes 67, 68 and 69 is applied to an amplifying tube 78 which is coupled in turn to another tube 79, the output of which is used to control the beacon transmitter 26.

If the switch 46 is connected, as shown, to the pulse-forming network 45, the transmitter 27 will send out pulses corresponding in width to the pulse 9 of Figs. 3 and 5. The beacon receiver 25 will pick up this radiation and will deliver the pulse 9 to the tubes 58 and 59. The tube 58 will cause the pulse to be applied across the oscillatory circuit 63 which will shock this circuit into oscillation, producing the oscillation 8 of Fig. 3 which is also shown at 19 in Fig. 5. This oscillation is amplified by the tubes 62 and 66 and is applied directly to the grid circuit of the tube 67. Before reaching the grid of the tube 68, however, this amplified oscillation passes through the delay circuit 75 so that the oscillation 20 of Fig. 5 is applied to the grid of the tube 68, this being the same as the oscillation 19 but delayed in time.

The pulse 9 applied to the grid of the tube 59 is amplified and then passes through the delay circuit 76, so that the tube 69 will receive the pulse at a later time to produce the pulse 21 of Fig. 5 on the tube 69.

Since the grids of the tubes 67 and 68 swing negative together for the first time at a time later than when the pulse 21 is applied to the grid of the tube 69, the grids of the three tubes 67, 68, and 69 will never be negative at the same time and therefore the plates of these tubes will not reach the potential of the source 70. Therefore, there will be nothing for the tubes 78 and 79 to amplify and the transmitter 26 will receive no pulse which would cause it to transmit and will therefore remain inactive.

If the operator of the transmitter 27 now desires to receive a signal from the beacon, so as to get his bearings, he shifts the switch 46 over to the contact 56. This connects the pulse-forming circuit 55 to the tube 30, and the transmitter 27 begins to send out pulses having a width corresponding to the pulse 6 of Figs. 2 and 4. The beacon receiver 25 receives this pulse, amplifies it and detects it, and delivers it to the grid circuits of the tubes 58 and 59. The tube 58 applies the pulse 6 across the oscillatory circuit 63 and shocks this circuit into oscillation, producing this oscillating wave 7 which is reproduced at 15 in Fig. 4. The tubes 62 and 66 amplify this oscillation and apply it directly to the grid of the tube 67. The tube 66 also delivers the oscillation to the delay network 75 which delays it for a period of time substantially equal to the time period of the oscillatory circuit 63 and then delivers it to the grid of the tube 68.

The pulse delivered to the tube 59 is amplified by that tube and then delivered to the delay circuit 76 from which it is applied to the grid of the tube 69 at a later time.

From an inspection of Fig. 4 it will now be evident that the grids of the tubes 67, 68 and 69 are negative simultaneously at about one and one-quarter time units from the beginning of the received pulse. Since the grids of all of the tubes 67, 68 and 69 are negative at the same time and are shut off, the plates of these tubes rise in potential to the potential of the source 70, and thus a positive pulse is delivered to the grid of the tube 78 and is amplified by the tubes 78 and is delivered to the beacon transmitter where it energizes the transmitter. The beacon signal is then radiated from the transmitter 26 and may be received by a suitable receiver provided for that purpose in the airplane. This receiver has not been shown in the drawings.

The discriminating circuit of the beacon will therefore respond to the short square pulse 6 but will not respond to the longer square pulse 9. These square pulses may each be considered as a unit or step function voltage followed after a period of time by another unit or step function voltage of opposite sign. For the beacon transmitter to be operated by the circuit, the oscillatory circuit 63 must receive a unit function voltage to shock it into oscillation followed at the proper time in the cycle by a unit function voltage of opposite polarity, to produce a damped oscillation the cycles of which are substantially uniformly spaced. Also the delayed unit function voltage which is applied to the grid of the tube 69 must reach there as a negative pulse the same time that the grids of the tubes 67 and 68 are negative, so as to shut off all three tubes simultaneously. Under no other condition will the circuit respond.

To meet this requirement the period of the oscillatory circuit 63 should be greater than the time duration of the longer of the two pulses which are to be discriminated, but less than twice the time duration thereof, and at the same time it should be greater than twice the time duration of the shorter of said pulses. This relation will insure an oscillation of uniformly spaced cycles when the oscillatory circuit is shocked into oscillation by the short pulse and an oscillation of non-uniformly spaced cycles when the long pulse is used to shock the oscillatory circuit into oscillation.

As shown and described, the circuit will respond when the short pulse is applied to it and will not respond when the long pulse is applied. However, the opposite result may be attained by making certain simple changes. For instance, if the delayed oscillation applied to the grid of the second tube 68 is reversed in polarity as, for instance, by inserting another tube between the delay circuit 75 and the tube 68, then the circuit will respond to the long pulse 9 and not to the short pulse 6. Also, if the delay circuit 75 be arranged to delay the oscillation for a period of time equal to one and one-half times the period of the oscillating circuit, this same result will be attained. Various other combinations of delay time and polarity of applied oscillations may be used to get different effects.

While the tube 69 has been shown connected in parallel with the tubes 67 and 68 as a convenient way of utilizing the response of the tubes 67 and 68 at a certain period of time only, other means for accomplishing this purpose may be used. It will be understood that although the pulse applied to the tube 69 is merely the delayed pulse from the output of the receiver 25, this particular wave shape is not essential for the tube 69. It is necessary only that the grid of the tube 69 be given a negative potential at the particular time desired.

The invention is particularly useful for airplanes which have radio-echo detection equipment and use a radio transmitter which sends out a succession of spaced pulses. The discriminating circuit at the beacon may then be arranged to respond only to pulses of less time duration than those transmitted during the normal operation of the radio-echo detection apparatus on the airplane. This simply requires the addition in the airplane of the pulse-forming circuit 55 and the switch 46, neither of which occupy any material space or add any material weight.

Various modifications may be made in the invention without departure from the spirit thereof and I do not therefore wish to limit myself to what has been shown and described except as such limitations occur in the appended claims.

What I desire to claim and secure by Letters Patent is:

1. A radio beacon system comprising a radio receiver, a first radio transmitter, means to control the operation of said first transmitter by said receiver, a second radio transmitter located at a remote point, means at said second radio transmitter to produce a voltage pulse of a predetermined time duration, means at said second radio transmitter alternatively to produce a voltage pulse of a different time duration, means to cause either of said voltage pulses to operate said second transmitter for the time duration of said pulses, and means associated with said receiver to cause said first transmitter to operate when one of said pulses is received but not to operate when the other of said pulses is received.

2. A radio beacon system comprising a radio receiver, a first radio transmitter, means controlled by said receiver to operate said transmitter, a second radio transmitter located at a remote point, means to form a voltage pulse of a predetermined time duration, additional means to form a voltage pulse of a predetermined different time duration, means to connect either of said pulse-forming means to said second transmitter, so as to cause said second transmitter to radiate a pulse of oscillations for the time duration corresponding to the particular pulse, and means associated with said receiver to operate said first transmitter when one of said pulses is received and not to operate it when the other of said pulses is received.

3. A radio beacon system comprising a radio receiver adapted to receive radiation of a predetermined high frequency, a first radio transmitter, means to control the operation of said transmitter by said receiver, a second radio transmitter located at a remote point, means to produce a pulse of a predetermined time duration, means to produce a pulse of a greater predetermined time duration, means to cause either of said pulses to operate said second transmitter for a period of time corresponding to the time duration of the pulse, and means associated with said receiver to cause said first transmitter to operate when the shorter of said pulses is received and not to operate when the longer of said pulses is received.

4. A radio beacon system comprising a radio transmitter, a radio receiver, means to divide the output of said receiver into two channels, an oscillatory circuit in one of said channels having a predetermined period of oscillation, a pair of circuits associated with said oscillating circuit, means in one of said last-mentioned circuits to delay oscillations passing therethrough for a predetermined period of time, means in said second channel to delay pulses passing therethrough for a predetermined time interval, and means to cause said transmitter to operate only when the voltages in the outputs of said pair of circuits and said second channel after the delay circuit therein have simultaneously the same sign and an amplitude greater than a predetermined value.

5. A radio beacon system comprising a radio reciver adapted to receive pulses of high-frequency radiation, an oscillatory circuit associated with the output of said receiver, means to pass any oscillations set up in said oscillatory circuit into two channels, means in one of said channels to delay the passage of oscillations therethrough for a predetermined period of time, means for delaying received pulses, a transmitter, and means to operate said transmitter only when the voltages in said two channels have the same sign and amplitude greater than a predetermined value at a predetermined time from the time from the start of oscillations in said oscillatory circuit and are in a predetermined time relation with the output of said received pulse delaying means.

6. A radio beacon system comprising a receiver, an oscillatory circuit adapted for oscillation when shock excited by a voltage pulse, means to apply the output of said receiver across said oscillatory circuit, a radio transmitter, means operative to cause said transmitter to operate when said oscillatory circuit is shocked into oscillation by a received pulse of a predetermined time duration, said means being further operative to prevent the operation of said transmitter when said oscillatory circuit is shocked into oscillation by a received pulse having any other time duration.

7. A radio beacon system comprising three thermionic tubes connected in parallel, an oscillatory circuit, means to shock said oscillatory circuit into oscillation, means to apply the oscillations produced in said circuit to the grid circuit of one of said tubes, means to apply the oscillations produced by said oscillatory circuit to the grid circuit of another of said tubes after a predetermined time delay, means to apply a negative potential to the grid of the other of said tubes a predetermined time after said oscillatory circuit is shocked into oscillation, the potentials of said three grids being simultaneously negative at a predetermined time whereby said three tubes are simultaneously shut off and produce a pulse in the output thereof.

8. A circuit for discriminating between pulses of different time durations comprising three thermionic tubes with their outputs connected in parallel, each of said tubes having a plate, a control grid, and a cathode, a source of potential connected between the cathodes and plates of said tubes, a high resistance in the common plate circuit of said tubes, an oscillatory circuit, means to shock said circuit into oscillation, means to apply the oscillations set up in said oscillatory circuit to the grid of one of said tubes, means to apply the oscillations set up in said oscillatory circuit to the grid of another of said tubes after a predetermined time delay, means to apply a negative potential to the grid of said third tube a predetermined time interval after said oscillatory circuit is shocked into oscillation, said time delay being such that when the oscillations of said oscillating circuit are substantially uniformly spaced in time the grids of said three tubes will be negative simultaneously.

9. A circuit for discriminating between pulses of different time durations comprising three tubes with their outputs connected in parallel, each of said tubes having a plate, a control grid, and a cathode, a source of potential connected between said cathodes and said plates, a high resistance in the common plate circuit of said tube, an oscillatory circuit, means to shock said circuit into oscillation, means to apply the oscillations in said oscillatory circuit to the grid of one of said tubes, means to apply the oscillations of said oscillatory circuit to the grid of another of said tubes after a time delay in the order of one cycle of said oscillations, and means to apply a negative potential to the grid of said other tube a period of time after the oscillations start in said oscillatory circuit which is in the order of one cycle of said oscillations.

10. A circuit for discriminating between pulses of different time durations comprising three thermionic tubes each having a plate, a control grid, and a cathode the outputs of said tubes being connected in parallel, a source of potential connected between the cathodes and plates of said tubes, a high resistance in the common plate circuit of said tubes, an oscillatory circuit having a period of oscillation such that the pulse to be discriminated against has a time duration greater than one-half the cycle of the oscillation, means to shock said circuit into oscillation by a pulse, means to apply the oscillations set up in said circuit to the grid of one of said tubes, means to apply the oscillations set up in said oscillatory circuit to the grid of another of said tubes after a time delay approximately equal to one cycle of said oscillation, and means to apply a potential to the grid of the other of said tubes after a time interval approximately equal to one cycle of oscillation, said potential and the first half cycle of said oscillations applied to said grids having the same sign.

11. A circuit for discriminating between two pulses of different time durations comprising an oscillatory circuit having a period greater than the time duration of the longer of said pulses but less than twice the time duration thereof and greater than twice the time duration of the shorter of said pulses, means to apply either of said pulses to said oscillatory circuit, so as to shock said circuit into oscillation, a pair of thermionic tubes, each having a plate, a control grid, and a cathode, the outputs of said tubes being connected in parallel, a source of potential connected between the plates and cathodes of said tubes, a high resistance connected in the common plate circuit, means to apply the oscillations produced by said oscillatory circuit to the grid of one of said tubes, means to apply the oscillations produced by said oscillatory circuit to the grid of said other tube after a time delay such that both grids will be negative simultaneously at a certain time after said oscillatory circuit has been shocked into oscillation by one of said pulses but will not be negative simultaneously at said time when said oscillatory circuit has been shocked into oscillation by the other of said pulses, and means to utilize the simultaneous shutting off of both of said tubes only at said certain time.

12. A circuit for discriminating between two pulses of different time durations comprising an oscillatory circuit having a period greater than the time duration of the longer of said pulses but less than twice the time duration thereof and greater than twice the time duration of the shorter of said pulses, means to apply either of said pulses to said oscillatory circuit so as to shock said circuit into oscillation, a pair of thermionic tubes each having a plate, a control grid, and a cathode, the outputs of said tubes being connected in parallel, a source of potential connected between the plates and the cathodes of said tubes, a high resistance connected in the common plate circuit of said tubes, means to apply the oscillations produced by said oscillatory circuit to the grid of one of said tubes, means to apply the oscillations produced by said oscillatory circuit to the grid of said other tube after a time delay approximately equal to the period of said oscillatory circuit, and means to utilize the simultaneous shutting off of both of said tubes when both of said grids are simultaneously negative only at a period of time after said pulse is applied to said oscillatory circuit which is substantially equal to the period of said circuit.

13. A radio beacon system comprising, a radio receiver, a first radio transmitter, means to control the operation of said first transmitter by said receiver, a second transmitter located at a remote point, means to radiate at will from said second transmitter pulses of high frequency oscillations, means at said second transmitter to produce pulses of differing predetermined time duration, and means associated with said receiver to cause said first transmitter to operate when a single pulse of a selected time duration has been received and not otherwise.

14. A radio beacon system including a beacon transmitter, a receiver coupled to said transmitter, said receiver being responsive solely to a single pulse of a predetermined time duration for actuating said transmitter.

15. A radio beacon system including a beacon transmitter, a receiver coupled to said transmitter, discriminating means within said receiver providing an output signal solely when said receiver is energized by a single pulse of a predetermined time duration, said transmitter being actuated by said receiver output signal.

16. A radio beacon system including a beacon transmitter, a receiver coupled to said transmitter, discriminating means within said receiver providing an output signal solely when said receiver is energized by a single pulse of a predetermined time duration and preventing an output signal when said receiver is energized by pulses of any other time duration, said transmitter being actuated by said receiver output signal.

17. In a radio beacon system, a first transmitter of a first or a second signal having differing time durations, a remote second transmitter, a remote receiver coupled to said second transmitter, and means at said receiver to cause said second transmitter to operate solely upon receipt of a single pulse having a time duration selected in correspondence with either said first or second signal.

18. In a radio beacon system, a first pulse transmitter, means at said transmitter for alternatively generating and radiating pulses of a first or a second time duration, a remote receiver, a second pulse transmitter, means at said receiver coupled to said second pulse transmitter, said means including a discriminator responsive solely to a single pulse of said second time duration for actuating said second pulse transmitter, said discriminator being further operative to preclude operation of said second pulse transmitter upon receipt of pulses of said first time duration.

LUIS W. ALVAREZ.

REFERENCES CITED

The following references are of record in the file of this patent:

UNITED STATES PATENTS

| Number | Name | Date |
|---|---|---|
| 2,103,090 | Plebanski | Dec. 21, 1937 |
| 2,132,590 | Baumann et al. | Oct. 11, 1938 |
| 2,134,716 | Gunn | Nov. 1, 1938 |
| 2,211,942 | White | Aug. 20, 1940 |
| 2,265,996 | Blumlein | Dec. 16, 1941 |
| 2,277,000 | Bingley | Mar. 17, 1942 |
| 2,308,375 | Loughren | Jan. 12, 1943 |
| 2,321,698 | Nolde | June 15, 1943 |
| 2,418,127 | Labin | Apr. 1, 1947 |
| 2,433,381 | Marchand | Dec. 30, 1947 |
| 2,434,937 | Labin | Jan. 27, 1948 |
| 2,444,455 | Labin | July 6, 1948 |

FOREIGN PATENTS

| Number | Country | Date |
|---|---|---|
| 528,192 | Great Britain | Oct. 24, 1940 |

OTHER REFERENCES

Nature, April 26, 1930, No. 3156, vol. 125, page 636, Method of Registering Multiple Simultaneous Impulses of Several Geiger's Counters, by Bruno Rossi.